United States Patent
Formoso et al.

(10) Patent No.: US 12,313,379 B2
(45) Date of Patent: May 27, 2025

(54) SYSTEM FOR NEUTRALISING A TARGET USING A DRONE AND A MISSILE

(71) Applicant: MBDA FRANCE, Le Plessis Robinson (FR)

(72) Inventors: Mathias Formoso, Le Plessis-Robinson (FR); Vincent Jeauneau, Le Plessis-Robinson (FR); Alexandre Kotenkoff, Le Plessis-Robinson (FR); Alain Bandini, Le Plessis-Robinson (FR)

(73) Assignee: MBDA FRANCE, Le Plessis Robinson (FR)

(*) Notice: Subject to any disclaimer, the term of this patent is extended or adjusted under 35 U.S.C. 154(b) by 154 days.

(21) Appl. No.: 17/437,626

(22) PCT Filed: Feb. 7, 2020

(86) PCT No.: PCT/FR2020/050214
§ 371 (c)(1),
(2) Date: Sep. 9, 2021

(87) PCT Pub. No.: WO2020/193881
PCT Pub. Date: Oct. 1, 2020

(65) Prior Publication Data
US 2022/0178656 A1    Jun. 9, 2022

(30) Foreign Application Priority Data
Mar. 27, 2019 (FR) ........................ 1903128

(51) Int. Cl.
*F41G 3/18* (2006.01)
*B64U 50/34* (2023.01)
(Continued)

(52) U.S. Cl.
CPC ............... *F41G 3/18* (2013.01); *B64U 50/34* (2023.01); *B64U 50/37* (2023.01); *B64U 80/82* (2023.01);
(Continued)

(58) Field of Classification Search
CPC . F41G 3/18; F41G 7/32; F41G 7/2206; F41G 7/226; F41G 7/2286; F41G 7/2293;
(Continued)

(56) References Cited

U.S. PATENT DOCUMENTS

| 6,455,828 B1 | 9/2002 | Gauggel et al. |
| 8,020,769 B2 | 9/2011 | Papale et al. |

(Continued)

FOREIGN PATENT DOCUMENTS

| CN | 107444642 A | 12/2017 |
| CN | 109405650 A | 3/2019 |

(Continued)

OTHER PUBLICATIONS

KR-101978494-B1 Translation (Year: 2017).*
(Continued)

*Primary Examiner* — Kenneth J Malkowski
*Assistant Examiner* — Ibrahim Abdoalatif Alsomairy
(74) *Attorney, Agent, or Firm* — FISHERBROYLES, LLP; Roger L. Browdy; James E. Mrose

(57) ABSTRACT

The neutralisation system (1) comprises a drone (2) configured to be able to fly close to a target and transmit at least position information concerning the position of the target, the neutralisation system (1) also comprising at least one missile (6) capable of being guided towards the target in order to neutralise it and at least one control station (8), the control station (8) comprising a receiving unit (9B) capable of receiving at least the position information transmitted by the drone (2) and a display unit (10A) capable of displaying (Continued)

this information to an operator, the missile (6) being configured to be able to be guided towards the target by means of the position information received by the control station (8).

14 Claims, 4 Drawing Sheets

(51) Int. Cl.
    *B64U 50/37* (2023.01)
    *B64U 80/82* (2023.01)
    *B64U 101/15* (2023.01)
    *B64U 101/30* (2023.01)
    *F41G 7/22* (2006.01)
    *G05D 1/00* (2024.01)

(52) U.S. Cl.
    CPC ......... *F41G 7/2206* (2013.01); *G05D 1/0094* (2013.01); *G05D 1/12* (2013.01); *B64U 2101/15* (2023.01); *B64U 2101/30* (2023.01)

(58) Field of Classification Search
    CPC ..... F41G 7/306; B64C 39/024; G05D 1/0094; G05D 1/12; G05D 1/689; B64U 50/34; B64U 80/82; B64U 2101/15; B64U 2101/00
    See application file for complete search history.

(56) References Cited

U.S. PATENT DOCUMENTS

| | | |
|---|---|---|
| 8,664,575 B2 | 3/2014 | Bril et al. |
| 9,836,049 B1 | 12/2017 | Tu |
| 10,048,039 B1 | 8/2018 | Bell et al. |
| 10,065,717 B1 | 9/2018 | Husain et al. |
| 10,073,454 B2 | 9/2018 | Aboutalib et al. |
| 2009/0212157 A1 | 8/2009 | Arlton et al. |
| 2011/0017863 A1* | 1/2011 | Goossen ............... F41G 7/303 244/3.14 |
| 2012/0247317 A1* | 10/2012 | Karakookly ........... F41A 27/28 89/127 |
| 2016/0082298 A1 | 3/2016 | Dagenhart |
| 2016/0285540 A1 | 9/2016 | Bhargava et al. |
| 2016/0341531 A1 | 11/2016 | Kotenkoff et al. |
| 2017/0233053 A1 | 8/2017 | High et al. |
| 2018/0094902 A1 | 4/2018 | McNeil et al. |
| 2018/0109767 A1* | 4/2018 | Li ........................ H04N 23/60 |
| 2018/0150087 A1* | 5/2018 | Enos ..................... H04L 67/12 |
| 2018/0238661 A1* | 8/2018 | Blache .................. F42B 5/313 |
| 2018/0341262 A1 | 11/2018 | Yeshurun |
| 2019/0068953 A1 | 2/2019 | Choi et al. |
| 2019/0100307 A1* | 4/2019 | Beltman ................ B64C 37/02 |
| 2019/0110270 A1* | 4/2019 | Chen ..................... H04W 64/00 |

FOREIGN PATENT DOCUMENTS

| | | | |
|---|---|---|---|
| EP | 2 080 981 A2 | 7/2009 | |
| EP | 2 392 890 A1 | 12/2011 | |
| EP | 2 405 233 A2 | 1/2012 | |
| EP | 2899491 A1 | 7/2015 | |
| FR | 3010180 A1 * | 3/2015 | ............ F41G 7/306 |
| GB | 2 148 465 A | 5/1985 | |
| KR | 20000036564 A | 7/2000 | |
| KR | 101978494 B1 * | 12/2017 | |
| RU | 2538509 C1 * | 1/2015 | |
| RU | 2 577 745 C1 | 3/2016 | |
| RU | 2 584 210 C1 | 5/2016 | |
| WO | 2016/154477 A1 | 9/2016 | |
| WO | 2018/026754 A1 | 2/2018 | |

OTHER PUBLICATIONS

FR-3010180-A1 Translation (Year: 2015).*
Hughes, Robin, Rafael launches Fire Weaver networked attack system, Jane's Missiles & Rockets, published Nov. 29, 2018.
Erwin, Sandra I., Small Drone and Missile Network Allows for Quick Strikes, National Defense, 92(646):46 (2007).
The Shephard News Team, "Spike and Skylite B team up to demonstrate real-time closure of sensor-to-shooter loop," www.shephardmedia.com/news/uv-online/spike-and-skylite-b-team-up-to-demonstra/, Sep. 25, 2008.
Li, et al., Development and Testing of a Two-UAV Communication Relay System, Sensors, 16:1-21 (2016).
Inside Unmanned Systems, "The World's Smallest 'Better Than GPS' Inertial Navigation System Now Available," https://insideunmannedsystems.com/worlds-smallest-better-gps-inertial-navigation-system-now-available/, pp. 1-2, Sep. 2017.
Orbital ATK, technical brochure entitled "Switchblade" with a copyright date 2017.
Defense Update, "Enhancing The New Spike Family," https://defense-update.com/20101231_spike_enhanced.htm#google_vignette, Dec. 2010.
Rafael Advanced Defense Systems Ltd., "Fire Weaver The Most Mature Networked Combat System," https://www.youtube.com/watch?v=iiukG6bfL04, pp. 1-4, Mar. 1, 2019.
Dynetics, "DARPA—Gremlins Program," https://www.youtube.com/watch?v=DJHKMPVWfN0, pp. 1-5, Dec. 21, 2018.
RAFAEL Advanced Defense Systems, "RAFAELS' Tycoon," https://www.youtube.com/watch?v=jMgyTUt8iyw, pp. 1-4, 2011.

* cited by examiner

SYSTEM FOR NEUTRALISING A TARGET USING A DRONE AND A MISSILE

TECHNICAL FIELD

The present invention relates to a neutralisation system which is provided with at least one drone and at least one missile and which is intended to neutralise a target.

In the context of the present invention, neutralising a target means acting on this target to destroy it at least in part or to render it at least partially inoperative.

PRIOR ART

The present invention applies to the military field and to the neutralisation of a target, such as a tank for example, by means of at least one missile.

In the documents FR-3 016 690 and EP-2 899 491, a target marking device is known which comprises at least one small flying unit, which is configured to fly at low altitude and to be guided by means of guidance commands, in order to approach a target and to mark it by means of the transmission of an electromagnetic signal. This target marking device can be integrated into a neutralisation system of a target. The neutralisation system also comprises a missile for neutralising the target, which is directed at the marking of the target made by the flying unit.

Thus, with the target marking made by the flying unit, it is not necessary for the missile (or an operator) to transmit signals, in particular a target designation beam, for the guidance of the neutralisation missile to the target. The missile is thus very discreet.

Such a neutralisation system has important advantages, but its use is limited. In particular, it is necessary for the missile to be able to detect the electromagnetic marking signal of the target in order to be able to make the neutralisation. In addition, the missile must be able to identify the target being neutralised.

It could be advantageous to improve this common neutralisation system, in particular to extend its field of application.

DISCLOSURE OF THE INVENTION

The present invention aims to improve such a neutralisation system. It relates to a system for neutralising a target, which comprises at least:
a drone configured to be able to fly close to a target and transmit at least positional information of the target; and
at least one missile adapted to be guided towards the target in order to neutralise it.

According to the invention, said neutralisation system further comprises at least one control station, the control station comprising a reception unit adapted to receive said positional information transmitted by the drone and a display unit adapted to display said information to an operator, and the missile is configured to be guided towards the target by means of said positional information received by the control station.

Thanks to the invention, an operator is in the neutralisation loop, in particular to help identify the target, to take the decision to neutralise the target and, in general, to participate in the guidance of the missile used for the neutralisation.

This intervention by the operator allows to extend the field of use of the neutralisation system, as described below.

In a first embodiment, the control station is configured to transmit the positional information directly to the missile. In a particular embodiment of this first embodiment, the neutralisation system comprises a firing station configured to fire and guide the missile, and said control station is integrated into said firing station.

Furthermore, in a second embodiment, the neutralisation system comprises a firing station configured to fire and guide the missile.

Further, said firing station is located remotely from said control station and is configured to transmit to the missile said positional information, which is received from said control station.

Furthermore, in a particular embodiment, the neutralisation system comprises at least one first flying machine comprising a transmission unit adapted to at least serve as a relay between the drone and at least the control station. In a particular embodiment, the drone is connected to the control station for an information transmission, via an information transmission chain comprising successively the drone, one or more first flying machines serving as relays and the control station.

Furthermore, advantageously, the neutralisation system comprises at least a second flying machine comprising at least one carrying structure configured to be able to receive at least one drone, said flying machine being configured to be able to transport by flight at least one drone installed on said carrying structure. Furthermore, advantageously, the second flying machine comprises a power supply unit configured to supply power to a drone installed on the carrying structure, for example by charging a battery of the drone.

Said first and second flying machines may be different flying machines, one of which has a transmission relay function and the other a transport function. However, in a preferred embodiment, it is a single flying machine that combines the characteristics of said first and second flying machines, i.e., it is used both to transport a drone or drones on site and to serve as a relay for the communication between the drone and the control station.

Furthermore, advantageously, the neutralisation system comprises a module for controlling the flying machine configured to be manipulated by an operator, in particular to guide the flying machine. The flying machine can thus be guided by an operator.

Alternatively or additionally, the flying machine is provided with a central unit adapted to automatically determine guidance commands used to guide the flying machine. Thus, the flying machine can fly autonomously.

In a preferred embodiment, the drone is provided with at least one sensor, in particular low cost because of the possibility for the small drone to get as close as possible to the target, which requires less powerful and therefore less expensive sensors.

Furthermore, in a particular embodiment, said drone is provided with a positioning device for determining the position of said drone, said positioning device comprising a reception unit forming part of a satellite positioning system, for example of the GPS type (Global Positioning System). This position of the drone can in particular be used to determine the position of the target when the drone is close to or in contact with the target.

Alternatively or additionally, said drone is provided with an integrated inertial reference system, adapted to generate inertial data of the drone, and the positioning device is configured to determine the position of the drone from the inertial data generated by said inertial reference system. This allows to determine the position of the drone, even when the data of the satellite positioning system is not accessible, at least temporarily, for example when the drone enters a structure (tunnel, etc.) or a building. Furthermore, advantageously, the neutralisation system comprises a module for controlling the drone configured to be manipulated by an operator, in particular to guide the drone. The drone can thus be guided by an operator.

Alternatively or additionally, the drone is provided with a central unit adapted to automatically determine guidance commands used to guide said drone. Thus, the drone can fly autonomously.

BRIEF DESCRIPTION OF FIGURES

The figures of the attached drawing will make it clear how the invention can be realised. In these figures, identical references designate similar elements.

DETAILED DESCRIPTION

Figure 1:
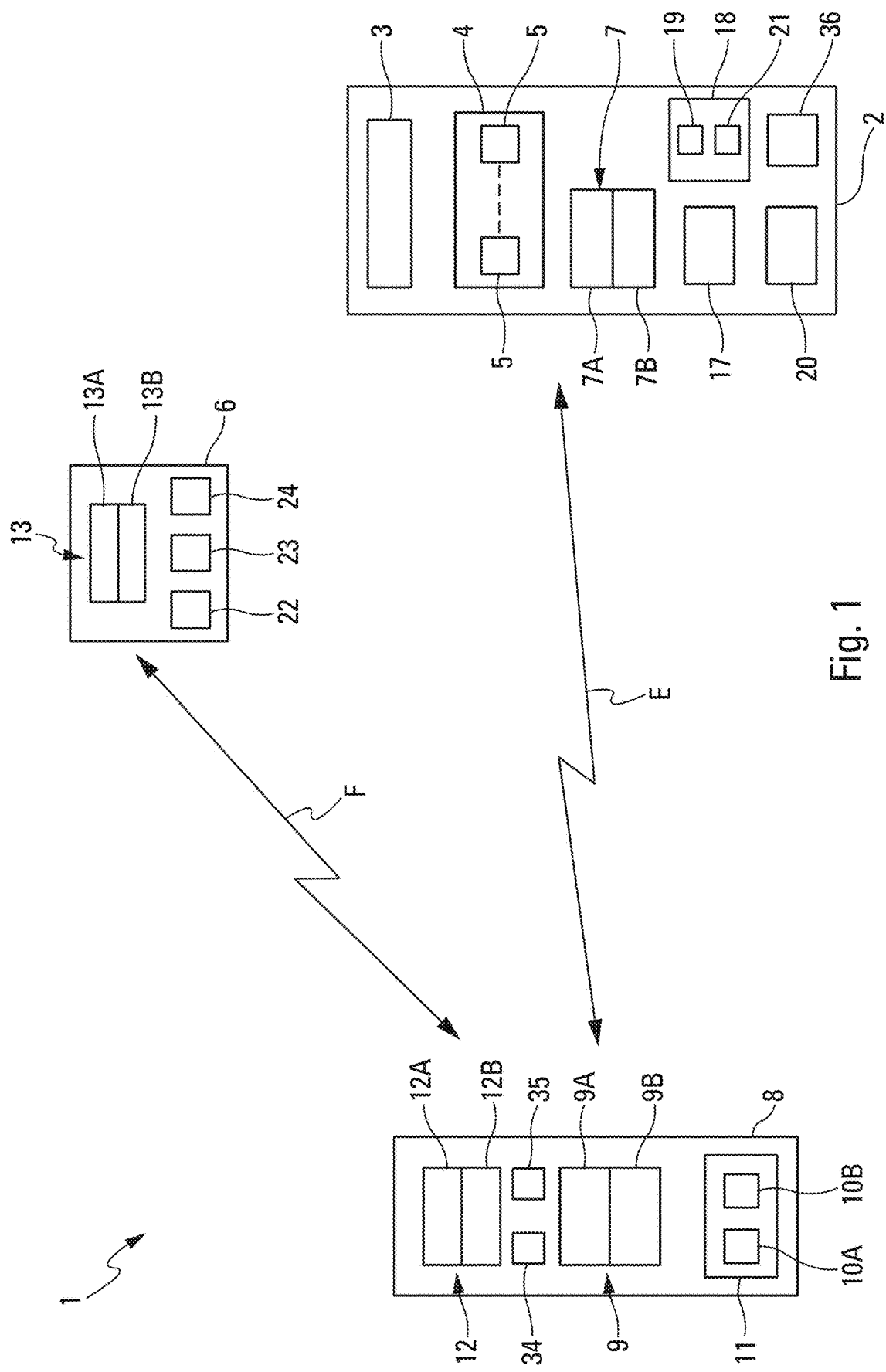
FIG. 1 is a block diagram of a first embodiment of a neutralisation system.
Figure 2:
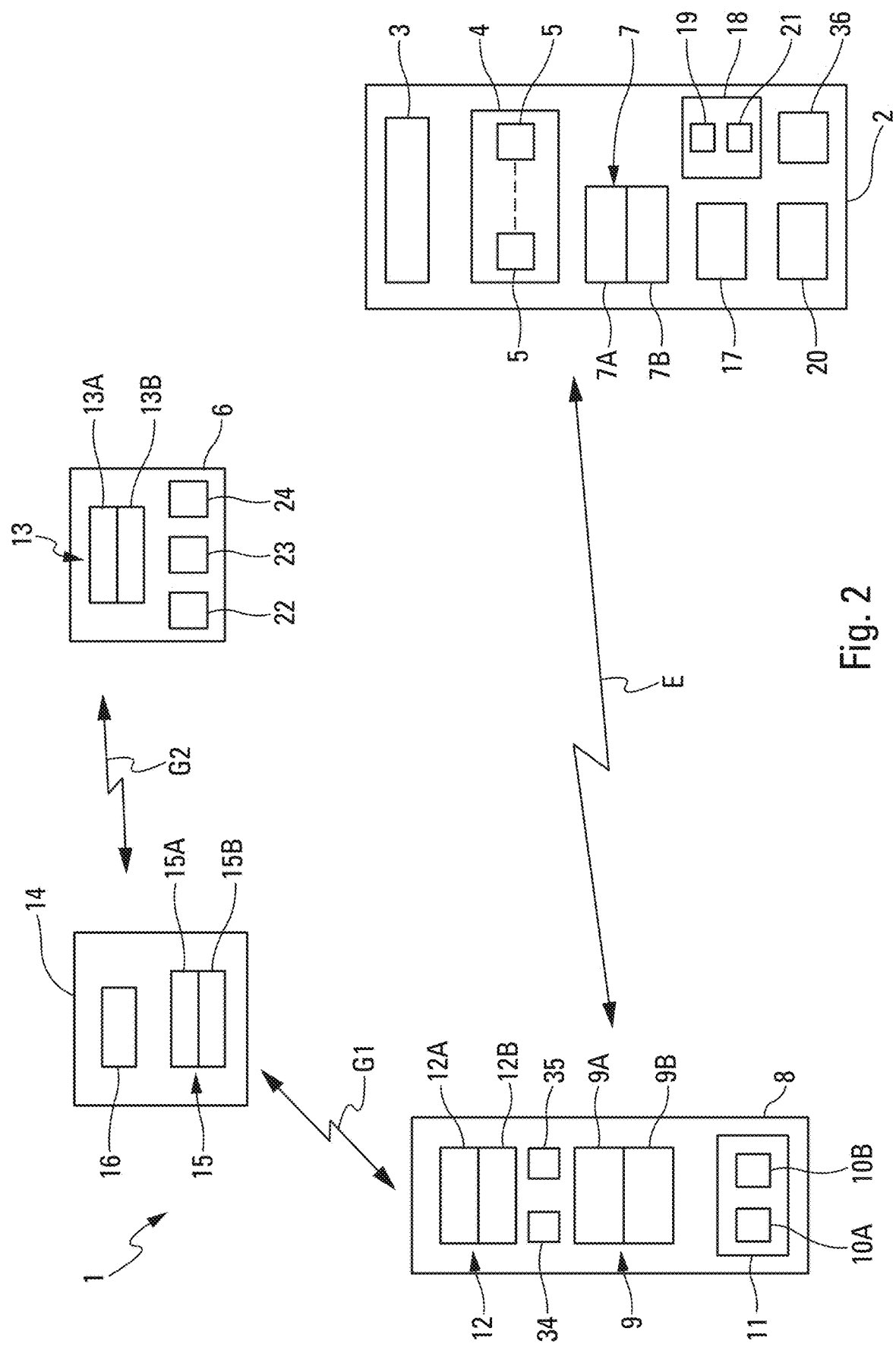
FIG. 2 is a block diagram of a second embodiment of a neutralisation system.
Figure 3:
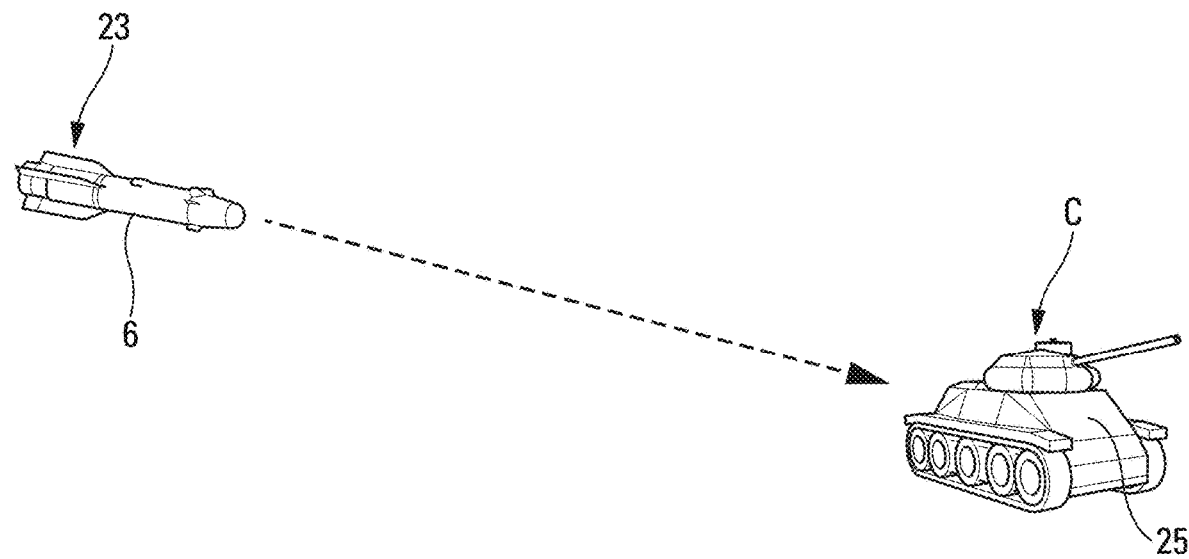
FIG. 3 shows a missile flying towards a tank representing a target to be neutralised.

The neutralisation system 1, shown schematically in two different embodiments in FIGS. 1 and 2, is intended at least to neutralise a target C, for example a tank as shown in FIG. 3.

Figure 4:
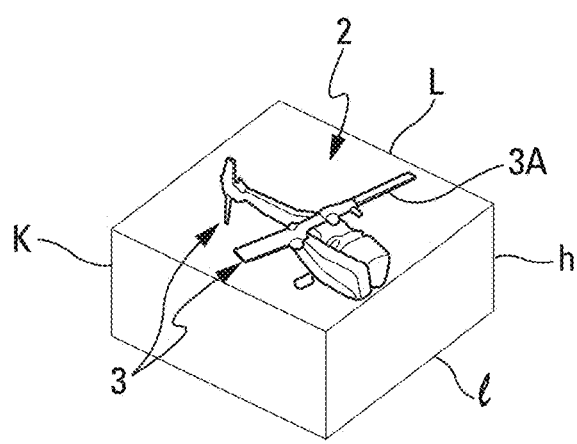
FIG. 4 is a perspective view of an example of drone.

For this purpose, the neutralisation system 1 comprises:
a drone 2, i.e. an unmanned aircraft, as shown in FIG. 4 by way of non-limiting illustration. This drone 2 comprises usual means 3 (in particular means for lifting (fixed wing 3A (FIG. 3), etc.), and means for generating a forward force), which are schematically represented in FIGS. 1 and 2 and which are formed in such a way as to make the drone 2 fly. More particularly, as specified below, the drone 2 is trained to fly at low altitude, guided by guidance commands. Preferably, the drone 2 is projected (or brought) as close as possible to the target C before flying towards the target C. Furthermore, preferably, the drone 2 is provided with a set 4 of sensors 5 specified below, which are in particular adapted to measure parameters of the environment; and
at least one missile 6 adapted to be guided towards the target C, as shown in FIG. 3, in order to neutralise it. In the example shown in FIG. 3, the target C is a tank 25.

Neutralising the target C means acting on this target C to destroy it at least in part, or at least to render it inoperative (at least partially).

In the scope of the present invention, the drone 2 may have various sizes.

In a particular embodiment, the drone 2 is such that it can fit within a cube of 3 meters sides.

Furthermore, in a particular embodiment of this particular embodiment, the drone 2 is of the "nano-drone" type and has, as shown by way of illustration (non-limiting) in FIG. 4, preferably the following characteristics:
a flight altitude of between 0 and 50 meters;
a size (i.e. dimensions in space) said to be reduced, i.e. a size smaller than that of a cube K (FIG. 4) of twenty centimeters sides, i.e. with: L<20 cm, l<20 cm, h<20 cm (with L: length; l: width; h: height). In other words, the size of the drone 2 is such that it can be completely inserted into such a cube K; and
a distance of approach of the drone 2 with respect to an objective (such as the target C) which is situated between 0 meters (or direct contact) and 10 meters depending on the case.

The drone 2, which in this particular embodiment has a reduced size allowing it to fly at low altitude without being detected, is thus able to approach (in a discreet way) a target C. The miniaturisation of the drone 2 is essential in terms of discretion in the military field.

The drone 2 comprises at least one sensor 5 adapted to determine positional information of the target C and a transmission element 7A adapted to transmit these positional information. Preferably, the transmission element 7A is part of a transmission/reception unit 7 which is mounted on the drone 2 and which further comprises a reception element 7B.

According to the invention, the neutralisation system 1 also comprises at least one control station 8. The control station 8, which is remote from the target C, i.e. which is distant from the latter, comprises a reception element 98 adapted to receive data or information (and in particular said positional information) transmitted by the transmission element 7A of the drone 2. Preferably, the reception element 9B is part of a transmission/reception unit 9 which is installed in the control station 8 and which additionally comprises a transmission element 9A.

In the scope of the present invention, whatever transmission/reception unit is considered, it comprises both:
a transmission element configured in the usual way for transmitting data (or information), for example via an antenna, in particular in the form of electromagnetic signals, data (or information) which can be received (i.e. picked up) by a reception unit of another transmission/reception unit which is remote; and
a reception element configured in the usual way for receiving, for example via an antenna, data (or information) which have been transmitted, in particular in the form of electromagnetic signals, by a transmission unit of another transmission/reception unit which is remote.

Thus, a bi-directional information transmission can be realised between the transmission/reception unit 7 of the drone 2 and the transmission/reception unit 9 of the control station 8, as illustrated by a double arrow E in FIG. 1. This data transmission link E may be of electromagnetic type or wired type. By means of this transmission, the neutralisation system 1 is adapted to transmit and receive information or data, in particular in the form of electromagnetic type signals, in order in particular to transmit information (and in particular information on the position of the target C) from the drone 2 to the control station 8 and commands (in particular guidance commands of said drone 2) from the control station 8 to the drone 2.

The control station 8 also comprises a display unit 10A adapted to present information and in particular said positional information to an operator (not shown) by displaying it on a screen (also not shown). The display unit 10A may in particular display information collected by one or more sensors 5 of the drone 2, such as a video stream or images, allowing in particular the operator to perform the identification of the target and providing him with data to make the decision to neutralise (or not) the target.

The control (and command) station 8 may in particular be located in a headquarters or in a command unit or be deployed in the field.

Furthermore, the missile 6 is configured to be guided towards the target C (or a group of targets) by means of said positional information received by the control station 8, in order to neutralise the target C.

Thus, the operator is part of the decision loop, in particular regarding the control and the guidance of the missile 6. Indeed, in this case, the operator can receive, via the data transmission link E, in particular positional information, for example in the form of images from the drone 2, which are displayed on the screen of the display unit 10A.

The operator can also generate commands, in particular for guidance or activation of particular functions of the drone 2, according to the information received.

The commands can be transmitted to the drone 2 either directly as shown in FIGS. 1 and 2 via the data transmission link E, or indirectly by means of relays as shown below with reference to FIG. 5.

For this purpose, the control station 8 comprises an interface unit 11 comprising, for example, the display unit 10A provided with a screen and a data input unit 10B such as a computer mouse, a touchpad or a voice recognition unit. This data entry unit 10B allows an operator to enter data, in particular data such as guidance or activation commands, which are to be transmitted via the data transmission unit E.

The neutralisation system 1 forms a communication network.

In a first embodiment shown in FIG. 1, the control station 8 is configured to transmit information, in particular positional information, directly to the missile 6.

For this purpose, the control station 8 comprises a transmission element 12A adapted to transmit said information. Preferably, the transmission element 12A is part of a transmission/reception unit 12 which is installed in the control station 8 and which further comprises a reception element 12B. The transmission/reception unit 12 may correspond to the transmission/reception unit 9 or may be a transmission/reception unit other than said transmission/reception unit 9 as in the example shown in FIG. 1.

Furthermore, the missile 6 comprises a reception element 13B adapted to receive said information transmitted by the transmission element 12A of the control station 8. Preferably, the reception element 13B is part of a transmission/reception unit 13 which is installed on the missile 6 and which further comprises a transmission element 13A.

Thus, a bi-directional information transmission can be realised between the transmission/reception unit 13 of the missile and the transmission/reception unit 12 of the control station 8, as illustrated by a double arrow F in FIG. 1. This data transmission link F may be of electromagnetic type or of wired type. By means of this transmission, the neutralisation system 1 is adapted to transmit and receive information or data, in particular in the form of signals of the electromagnetic type, in order in particular to transmit from the control station 8 to the missile 6 commands (in particular for guiding said missile 6) which are for example generated by the operator with the aid of the interface unit 11 and possibly to receive data from said missile 6.

In a particular embodiment (not shown) of this first embodiment, the neutralisation system 1 comprises a firing station configured to fire and guide the missile 6, and the control station 8 is integrated into this firing station.

Furthermore, in a second embodiment shown in FIG. 2, the neutralisation system 1 comprises a firing station 14 which comprises conventional means 16 which are configured to fire and guide the missile 6 in a conventional manner. The firing station 14 is located remotely from the control station 8.

The control station 8 transmits information to the firing station 14 which is configured to then transmit information to the missile C, for example said positional information or guidance commands (generated at the control station 8 or at the firing station 14).

For this purpose, the control station 8 comprises a transmission/reception unit which may correspond to the transmission/reception unit 12, as in the example shown in FIG. 2, or may be a transmission/reception unit other than said transmission/reception unit 12.

In addition, to communicate with the control station 8, the firing station 14 comprises a transmission/reception unit 15 comprising a transmission element 15A and a reception element 15B.

Thus, a bi-directional information transmission can be realised between the transmission/reception unit 12 of the control station 8 and the transmission/reception unit 15 of the firing station 14, as illustrated by a double arrow G1 in FIG. 2. This data transmission link G1 may be of electromagnetic type or of wired type.

Furthermore, for communicating with the missile 6, the firing station 14 comprises a transmission/reception unit which may correspond to the transmission/reception unit 15, as in the example shown in FIG. 2, or may be a transmission/reception unit other than said transmission/reception unit 15.

Furthermore, for this purpose, the missile 6 comprises a transmission/reception unit which may correspond to the transmission/reception unit 13, as in the example shown in FIG. 2, or may be a transmission/reception unit other than said transmission/reception unit 13.

Thus, a bi-directional information transmission can be realised between the transmission/reception unit 15 of the firing station 14 and the transmission/reception unit 13 of the missile 6, as illustrated by a double arrow G2 in FIG. 2. This data transmission link G2 can be of electromagnetic type or of wired type.

Furthermore, in a preferred embodiment (not shown), the neutralisation system 1 comprises the characteristics of both embodiments of FIGS. 1 and 2, with both the data transmission link F and the data transmission links G1 and G2. The choice between a direct transmission from the control station 8 to the missile or an indirect transmission via the firing station 14, depends on the current situation, namely in particular the mission, the type of missile used, the geographical position of the different elements, etc.

In a preferred embodiment, the drone 2 is provided with one or more low cost sensors 5. Indeed, because of the possibility for the small drone 2 to get as close as possible to the target C, it can use lower performance and cost sensors.

The drone 2 comprises sensors 5 allowing the search, the localisation and/or the identification of the target C. The operator carries out the identification or the confirmation of the identification via the information collected by these sensors 5 and transmitted to the control station 8.

By way of illustration, in a particular embodiment, the drone 2 is provided with at least some of the following usual sensors 5 (or identification means):

- a sensor adapted to generate an image (optical or infrared) or a video stream of at least a part of the environment of the drone 2. This image (or this video stream) can be displayed on the screen of the display unit 10A located at the level of the control station 8, which allows a remote operator to see the environment of the drone 2 and in particular, where appropriate the target C, and this before (and possibly after) the neutralisation of the target C;

a thermal sensor;

a sensor adapted to analyse a chemical parameter (chemical signature analysis: paints, explosives, exhaust gases, etc.);

a sensor adapted to analyse an electromagnetic parameter;

a mechanical-type sensor (sonar, vibration detector or seismic detector);

a lidar;

a telemeter.

The drone 2 comprises sensors allowing an extraction of coordinates on the target C to be neutralised and an update of these coordinates, which are sufficiently precise to be able to proceed with the guidance of the missile 6 in real time towards this target C. All or part of the navigation and guidance phase of the missile 6 is implemented from the coordinates provided to the control station 8 by some of the sensors 5.

In addition to the coordinates of the target C, any other information likely to help the engagement or guidance of the missile 6, in particular kinematic information (speed, acceleration, etc.) and possibly the attitude (spatial orientation) of the target C, may also be transmitted via the link E.

Furthermore, the neutralisation system 1 comprises a control module 34 configured to be manipulated by an operator for the purpose of controlling the drone 2, in particular for guiding the drone 2 or for controlling other actions such as activating a sensor or any other equipment of the drone 2. This control module 34 may form part of the control station 8, as shown in FIGS. 1 and 2, for example by being integrated into the interface unit 11. This control module 34 can also be a remote module, which is linked by a dedicated information transmission link to the drone 2 and which can be controlled by an operator present in the area of the operations.

In a particular embodiment, the drone 2 is provided with a central unit 17 adapted to automatically determine guidance commands used by the means 3 for guiding said drone 2. The drone 2 can thus be guided automatically without intervention (or with limited intervention) of an operator, generally by following a pre-established flight plan. The drone 2 can thus fly autonomously.

The drone 2 can therefore either be guided autonomously or controlled remotely by an operator via the control module 34.

Furthermore, in a particular embodiment, the drone 2 is provided, as shown in FIGS. 1 and 2, with a positioning device 18 configured to determine the (geographical) position of the drone 2 in the space. The positioning device 18 comprises a reception unit 19 which is part of a satellite positioning system, for example a GPS (Global Positioning System).

The position of the drone 2, determined by the positioning device 18, can in particular be used to determine the position of the target C when the drone 2 is in the vicinity of or in contact with the target C and thus to generate said positional information of the target C.

It can also be used to guide the drone 2, either by allowing an operator to follow the drone 2 when it is remotely guided, or by providing current positional information to the central unit 17 during an automatic guidance.

Alternatively or additionally, the drone 2 is provided with an integrated inertial reference system 20. This inertial reference system 20 is adapted to generate, in a usual way, inertial data of the drone 2, such as its speed or its acceleration in particular. The positioning device 20 comprises a computing unit 21 which is configured to determine the position of the drone 2 using inertial data generated by the inertial reference system 20, as well as using for example one or more local maps (e.g. of a building in which the drone will enter) when such maps are available. Thus, the positioning device 18 is able to determine the position of the drone 2 even when the data of the satellite positioning system is not accessible at least temporarily, for example when the drone 2 enters a structure (such as a tunnel for example) or a building.

In this case, inertial data can be used to determine the position (relative) with respect to the last measured absolute position (preferably using GPS data).

This inertial data can also be used by the computing unit 21 in conjunction with the GPS data, for example to refine the determined position with the aid in particular of data supplied by the reception unit 19.

The localisation mode can be based on the use of different sensors such as, in particular, a camera (visible or thermal), a lidar, an inertial sensor, a telemeter, a GPS sensor. All this information (from the sensors) can also be hybridised together to improve the quality of the localisation (position of the drone 2).

In a particular embodiment, the drone 2 may be equipped with a small warhead 36 adapted to directly neutralise a target without a missile being fired. This warhead 36 may in particular be triggered automatically or by an operator with the aid in particular of the control unit 34.

In a particular embodiment, the drone 2 incorporates a device allowing it to land on the target C to mark it briefly or more permanently, and to allow it to be located regardless of its movements. This device allows in particular to mark the target in an area (urban area, etc.) that is not conducive to a strike by the missile and to neutralise the target (thus marked) once it has left this area. Thanks to its approach capabilities and its reduced size, the drone 2 is also adapted to mark the target in a difficult to access area or without direct vision.

Furthermore, as shown in FIGS. 1 and 2, the missile 6 further comprises:

a management unit 22 formed so as to manage (or process) information, in particular positional information, received via the data transmission link F or G2, with the aim of guiding the missile 6;

conventional means 23 (in particular means for lifting and for generating a forward force), which are schematically shown and which are formed so as to make fly the missile 6; and means 24 for neutralising the target C, in particular a warhead.

The 6 missile is thus very discreet and has a low cost. Furthermore, it is autonomous, as it uses only the signals relative to the data transmission link F or G2 to be guided to the target C.

Figure 5:
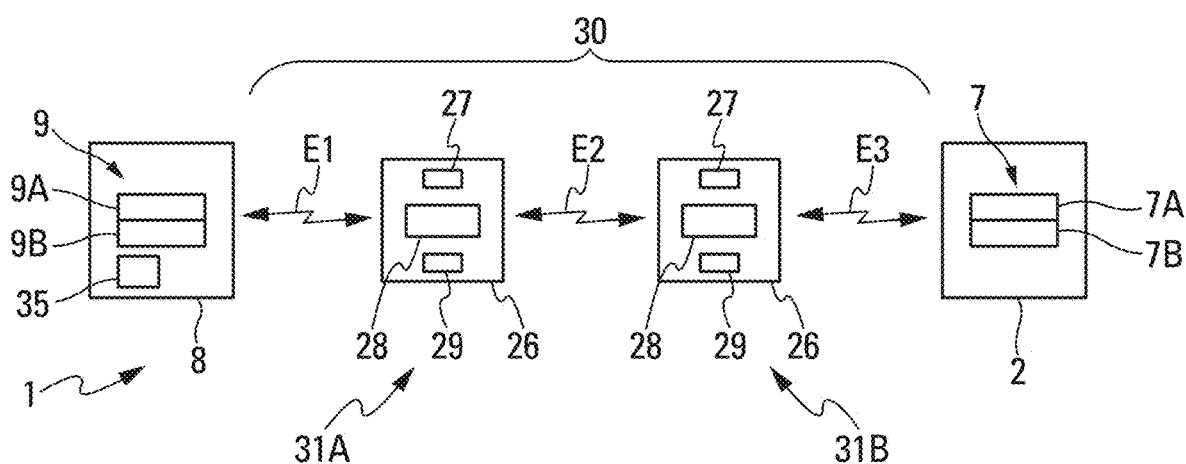
FIG. 5 shows schematically an information transmission chain between a drone and a steering position.

Furthermore, in a particular embodiment shown in FIG. 5, the neutralisation system 1 comprises at least one flying machine 26.

This flying machine 26 is a drone, i.e. an unmanned aircraft. This flying machine 26 comprises conventional means 27 (in particular means for lifting (rotary wings 33 (FIG. 6)) and for generating a forward force), which are shown schematically and which are formed in such a way as to make fly the flying machine 26.

The flying machine 26 also comprises a transmission unit 28 adapted to at least serve as a relay between the drone 2 and at least the control station 8. This transmission unit 28 is configured to retransmit electromagnetic signals it receives.

For this purpose, the flying machine 26 can be integrated in both the embodiment of the neutralisation system 1 of FIG. 1 and that of FIG. 2, in order to serve as a relay between the drone 2 and the control station 8. For reasons of simplification of the drawing, only the transmission/reception units 7 and 9 are shown in FIG. 5; it being understood that the drone 2 and the control station 8 may comprise all the other elements and systems described elsewhere and shown in particular in FIGS. 1 and 2.

The neutralisation system 1 further comprises a control module 35 of the flying machine 26, configured to be manipulated by an operator, in particular to guide the flying machine 26. This control module 35 may be part of the control station 8, as shown in FIGS. 1, 2 and 5, being for example integrated in the interface unit 11. This control module 35 may also be autonomous and be linked by a dedicated information transmission link dedicated to the flying machine 26. The flying machine 26 may thus be guided by an operator using said control module 35.

Alternatively or additionally, the flying machine 26 is provided with a central unit 29 adapted to automatically determine guidance commands used to guide the flying machine 26. Thus, the flying machine 26 can fly autonomously.

In the particular embodiment shown in FIG. 5, the drone 2 is connected to the control station 8 for an information transmission, via an information transmission chain 30. This information transmission chain 30 between the drone 2 and the control station 8 comprises one or more flying machines 26 serving as relays, namely two flying machines 26 in the example of FIG. 5.

In the example of FIG. 5, the control station 8 communicates with one flying machine 26 (located at a position 31A) via an information transmission link E1 by means of the transmission/reception unit 9 of the control station 8 and the transmission unit 28 of the flying machine 26, this flying machine 26 communicates with the other flying machine 26 (located at a position 31 B) via an information transmission link E2 by means of their respective transmission units 28, and this second flying machine 26 communicates with the drone 2 via an information transmission link E3 by means of the transmission unit 28 of the flying machine 26 and the transmission/reception unit 7 of the drone 2.

The flying machine or the flying machines 26 are used as relay, in particular when the drone 2 does not have enough range to communicate with the control station 8.

Figure 6:
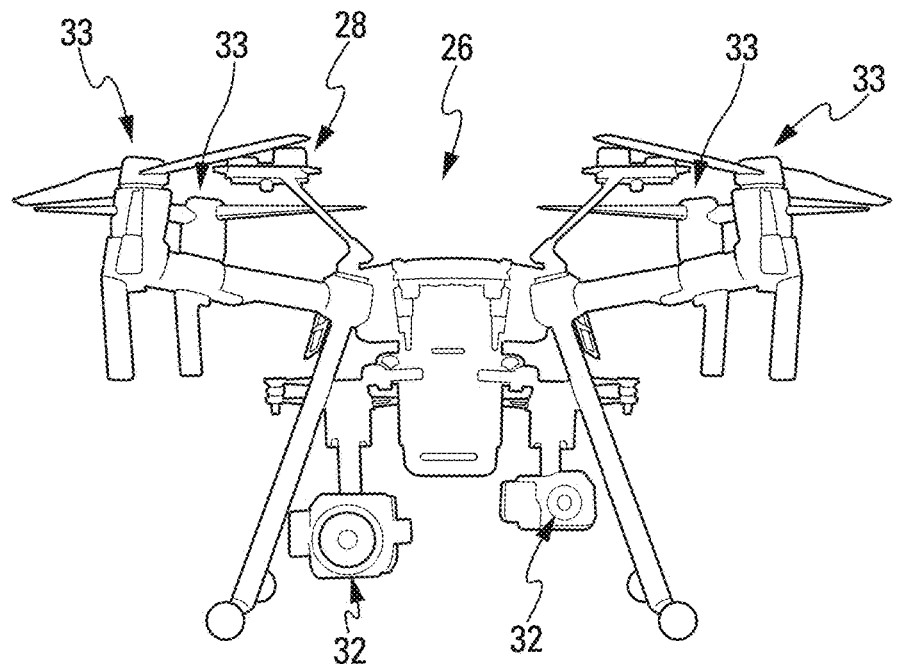
FIG. 6 is a perspective view of an example of flying machine.

Furthermore, in a preferred embodiment, one or more of the flying machines 26 comprise at least one carrying structure 32, as shown in FIG. 6.

The one or more carrying structures 32 are configured to each accommodate one or more drones 2. Each carrying structure 32 comprises means (not shown) for receiving and securing the drone 2.

The flying machine 26 is thus configured to be able to transport (by flight) at least one drone 2 that is installed on one of the carrying structures 32. The flying machine 26 has characteristics (in particular size and power) that allow such a transport to be carried out. The drone 2 can thus be transported to a mission area by a flying machine 26 having a greater range and autonomy than those of the drone 2. In particular, the flying machine 26 may be used when the drone 2 does not have sufficient range or autonomy to approach the target C, for example from a drop zone.

Furthermore, the flying machine 26 comprises a power supply unit (not shown) which is configured to electrically power a drone 2 mounted on the carrying structure 32, for example by comprising usual means for charging a battery of the drone 2.

This flying machine with a transport function may be different from the flying machines with a transmission relay function.

However, in the preferred embodiment, it is one and the same flying machine 26 which serves both to transport one or more drones 2 on site to take them close to the target C and to serve as a relay (via a transmission unit 28) for the communication between the drone 2 and the control station 8, either individually or via a communication chain 30 comprising other relay flying machines 26.

When the missile 6 has performed out its mission, i.e. when it has neutralised the target C, for example a building or a vehicle such as a tank 25 as shown in FIG. 6, the drone 2 can carry out a mission report, for example by taking an image (or a video) of the environment of the neutralised target C, using an appropriate sensor 5. This image (or this video) can:

- be sent to the remote control station 8 to be presented on the display unit 10A, which allows in particular an operator located at this remote control station 8 to know immediately if the missile 13 has successfully completed its mission; and/or
- be stored in a memory (not shown) integrated in the drone 2, for a further reading and processing.

The drone 2 must be small and agile enough to approach the target C and/or to enter a confined space, while remaining discreet. The drone 2 (of observation and acquisition) may implement at least some of the following functions:

- approaching the target C;
- observing and recognising the target C;
- measuring parameters of the environment of the target C;
- transmitting an information, in particular positional information, to the control station 8; and
- possibly carrying out a verification of the neutralisation of the target C and providing a mission report.

The neutralisation system 1, as described above, thus has the following advantages in particular:

- it makes the location, the identification and the assignment of a target C more reliable;
- it keeps an operator in the decision loop;
- by providing information to the control station, it allows more time for the implementation of an observation and acquisition step;
- it allows to reduce the cost of the functional chain:
  - because the expensive acquisition functions are not integrated into the missile 6, but are deported in the drone 2 which can be reused; and
  - because when approaching the target C, the drone 2 (of observation and acquisition) can use low-cost sensors 5; and
- it offers a flexibility of use.

The neutralisation system 1 can be used to neutralise various types of targets, and in particular land targets (movable elements or infrastructure elements), naval targets (ships or infrastructure elements), light equipment, elements located in open or confined spaces, and possibly airborne elements operating at low altitudes (such as helicopters for example).

The invention claimed is:

1. A system for neutralizing at least one target, said system comprising at least:

a drone configured to be able to fly toward a target and transmit at least positional information of the target;

at least one missile adapted to be guided towards the target in order to neutralize it;

at least one control station, the control station comprising a reception unit adapted to receive said positional information transmitted by the drone and a display unit adapted to display said information to an operator; and a firing station configured to fire and guide the missile, said firing station being located remotely from said control station, said control station being configured to cause said firing station to transmit guidance commands to the missile based on the positional information, which is received by said control station from the drone;

the drone, the missile, the control station, and the firing station being distinct from and located remotely from each other;

wherein the drone is configured to transmit the positional information of the target to the control station, which is configured to receive the positional information of the target from the drone and to display the positional information of the target to the operator on the display unit and to cause the firing station to transmit the guidance commands to the missile, based on the positional information of the target in real time, during a navigation and guidance phase of the missile after firing of the missile, and the missile is configured so that it can be guided in real time towards the target solely by means of the guidance commands based on said positional information, received by the control station from the drone, during the navigation and guidance phase of the missile after firing of the missile.

2. The system according to claim 1, wherein the control station is also configured to transmit the positional information directly to the missile.

3. The system according to claim 1, further comprising at least one flying machine, distinct from the drone, comprising a transmission unit adapted to at least serve as a relay between the drone and at least the control station.

4. The system according to claim 3, wherein the drone is connected to the control station for an information transmission, via an information transmission chain comprising successively the drone, one or more flying machines serving as relays and the control station.

5. The system according to claim 1, further comprising at least one flying machine, distinct from the drone, comprising at least one carrying structure configured to be able to receive at least one drone, said flying machine being configured to be able to transport by flight a drone installed on said carrying structure.

6. The system according to claim 5, wherein the flying machine comprises a power supply unit configured to supply power to a drone installed on the carrying structure.

7. The system according to claim 5, further comprising a module for controlling the flying machine configured to be manipulated by the operator.

8. The system according to claim 3, wherein the flying machine is provided with a central unit able to automatically determine guidance commands used to guide said flying machine.

9. The system according to claim 1, wherein said drone is provided with at least one sensor.

10. The system according to claim 1, wherein said drone is provided with a positioning device for determining the position of said drone, said positioning device comprising a reception unit forming part of a satellite positioning system.

11. The system according to claim 10, wherein the drone is provided with an integrated inertial reference system, adapted to generate inertial data of the drone, and the positioning device is configured to determine the position of the drone at least from the inertial data generated by said inertial reference system.

12. The system according to claim 1, further comprising a module for controlling the drone configured to be manipulated by the operator.

13. The system according to claim 1, wherein the drone is provided with a central unit adapted to automatically determining guidance commands used to guide said drone.

14. The system according to claim 2, wherein the control station is further configured to transmit the positional information directly from the control station to the missile, such that the positional information can be transmitted directly from the control station to the missile or via the firing station depending on a current situation.

* * * * *